Figures 1, 2:
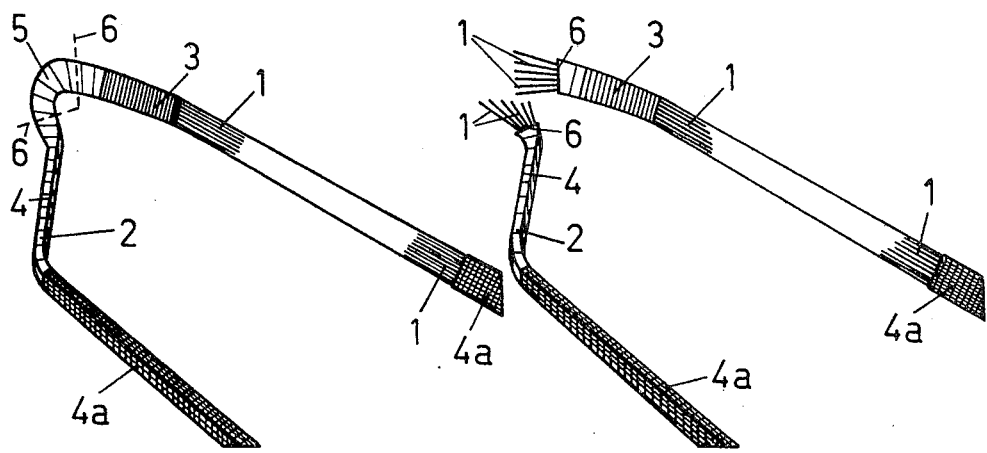

United States Patent [19]
Schuler

[11] 3,914,860

[45] Oct. 28, 1975

[54] METHOD OF PRODUCING A COIL WINDING FOR A DYNAMO-ELECTRIC MACHINE

[75] Inventor: Roland Schuler, Wettingen, Switzerland

[73] Assignee: BBC Brown Boveri & Company Limited, Baden, Switzerland

[22] Filed: May 20, 1974

[21] Appl. No.: 471,696

[30] Foreign Application Priority Data
June 12, 1973 Switzerland.................. 8348/73

[52] U.S. Cl. .................. 29/596; 29/605; 310/45; 310/208; 310/260; 310/270
[51] Int. Cl.² ................................. H02K 15/06
[58] Field of Search ....... 29/596, 605; 310/208, 45, 310/260, 270

[56] References Cited
UNITED STATES PATENTS

| | | | |
|---|---|---|---|
| 568,414 | 9/1896 | Short | 310/208 |
| 2,928,964 | 3/1960 | Jones | 310/208 |
| 3,431,639 | 3/1969 | Reimer et al. | 310/208 X |
| 3,453,468 | 7/1969 | Lund | 29/596 X |
| 3,474,527 | 10/1969 | Meyer | 29/596 |
| 3,629,024 | 12/1971 | Kimura et al. | 310/208 X |

*Primary Examiner*—Carl E. Hall
*Attorney, Agent, or Firm*—Pierce, Scheffler & Parker

[57] ABSTRACT

Conventionally, coil units for the stator of a dynamo-electric machine comprise a plurality of individual, shaped and pre-insulated conductors and which are wound with layers of insulating tape and then installed in the stator slots. The complete unit consisting of the laminated stator iron and the coils is then impregnated with synthetic resin that is then cured to a hardened state. To facilitate coil repair and or replacement, separation zones are established in the overhanging coil heads by applying a non-adhesive separation medium, preferably a silicon resin, to the individual insulated conductors and the coil insulation applied thereto prior to installation of the coils in the stator and their final impregnation with the to be hardened resin. The non-adhesive silicon resin blocks out the impregnating resin at these zones and thus prevents the individual conductors as well as the one or more layers of coil insulation from being glued to each other.

5 Claims, 3 Drawing Figures

U.S. Patent  Oct. 28, 1975  3,914,860

METHOD OF PRODUCING A COIL WINDING FOR A DYNAMO-ELECTRIC MACHINE

The present invention relates to an improved method for the manufacture and installation of current-carrying coils utilized in the construction of dynamo-electric machines, e.g. a stator component of such machines, wherein the individual coils are first installed insulated but non-impregnated in slots of the machine component and there fastened into place by suitable means such as by key-type wedges and impregnatable bands of insulation material, and thereafter the entire component including the coils is impregnated with a hardenable synthetic resin which is then cured. The invention also relates to a novel coil structure manufactured in accordance with the improved method.

As already disclosed in publication No. 3887D, July 1970 and in News Letter No. 9, 1967 — both published by BBC Brown Boveri and Company Limited — it is known to manufacture high-voltage dynamo-electric machines of medium output by use of the all-impregnation technique. The method there disclosed for making the coils from a plurality of parallel conductors collected together consists in the steps of properly shaping into the desired coil form the several conductors, each of which is usually insulated by a coating of enamel and an additional cover of glass-fiber or mica-containing tapes, thereafter wrapping the coil with a continuously running insulation band made from a combination of glass silk and fine mica, the wrapping taking place several times over the entire length of the coil so as to form a continuous, uniform, multi-layer insulation over the entire surface of the coil. The completed insulated coils are then inserted in an unimpregnated state, i.e. essentially dry, and if necessary with a further coating for glow protection, into the slots of the machine component e.g. the laminated iron packet forming the stator, and electrically interconnected. The coil slots are then closed off in the usual manner such as by use of magnetically conductive keyed-in wedges, or by similar wedges made from insulating materials. The opposite ends of the coils known as the coil heads overhang the opposite ends of the stator, i.e. these head portions extend beyond the ends of the slots, and are supported by means of one or more encircling bands of absorbant glass fiber which extend over the entire surface of the overhang and are connected together in a suitable manner at their ends. Humidity is removed from the coil by a drying process, and the stator, complete with the connected-together coils thereon, is then placed in an impregnating vessel where, after being subjected to an evacuation step, it is impregnated with a hardenable synthetic resin which is free of solvents. A period of applied pressure follows to facilitate penetration of the resin into all insulated parts and supporting components such as the glass-fiber bands which bind the overhanging coil heads into place. A period of curing then follows at increased temperature so as to secure everything rigidly into place as the resin hardens and attains its final state.

The objective of the present invention is to provide an improvement in this general, overall method where notwithstanding the steps of simultaneously impregnating the conductor insulation and the supporting components and the stator structure by a curable synthetic resin of known type and thereafter curing it, there will still remain selected predetermined separation zones along the coils where the impregnating resin does not form a homogeneous and solid bond as between the individual insulated conductors or the insulation material wrapped about the conductor bundle. The objective is achieved by application of a non-adhesive silicon resin to the individual insulated electrical conductors and to the insulation band with which these conductors are wrapped. By locating these so-called "separation zones" at the coil heads, i.e. at the overhang portions of the coils at opposite ends of the stator, it becomes feasible to replace one or several coils, or individual parts of a coil should any defect therein take place. These separation zones, located at the axially outermost ends of the coil heads, thus provide a portion of the coil head where the individual wires of the coil can be separated out from each other despite the thermocured resin insulation and also without interfering with the manner in which the remainder of the coil heads are properly bound in by the banding material applied thereto.

The obvious advantage in the invention is that one avoids the necessity of replacing entire units of the dynamo-electric machine, e.g. the complete laminated stator package together with all associated coils, even though only a minor repair job would be involved. By means of the invention one is able for example to readily disconnect defective individual coils by first cutting the individual conductors at the specially prepared separation zone, lift the defective coil from the slot, replace it with a new coil, reconnect the cut conductors by re-soldering or re-welding, and then properly re-insulate the separation zone and thereafter re-impregnate it.

In carrying out the improved method according to the present invention, the following steps are followed in sequence which they appear.

a. The coil units are formed and shaped to the desired configuration from a plurality of individual, pre-insulated conductors.

b. A separation medium, preferably a non-adhesive silicon resin is applied to the conductors of the coil thus formed at those sections along it where the separation zone is desired to be established, e.g. at the outermost ends of the overhanging coil heads.

c. A mica-containing, impregnatable tape of insulation material is then helically wrapped in several layers around the coil.

d. The wrapped insulation material of (c) is then impregnated with the non-adhesive separation medium at the desired separation zones established in step (b).

e. The coils completed in accordance with steps (a) to (d) are then installed in their respective slots of the machine component, e.g. the laminated iron stator package such that the coil heads extend beyond and thus overhang the slots.

f. The completed machine component together with the coils installed therein is then impregnated with the curable synthetic resin and cured e.g. at an elevated temperature to its final hardened state.

The principal advantage derived from a practice of the invention is that due to the provision of a so-called separation section or zone within each coil, located preferably within the region of the coil eye formed at the outer end of the coil head or overhang, and due to the described pre-treatment of the insulation in this zone, it will be possible to re-open this zone in the event of a breakdown in any particular coil, separate the conductors from each other, make the necessary repair and to perform the re-connection thereafter. The other advantages of the all-impregnation technique, i.e. simultaneous impregnation of both the stator iron package and the installed coils, such as for example the rigid support provided for the coil heads can still be maintained and ensured if the cutting points for the coil conductors are arranged in a zone within the coil head which is not subjected to heavy mechanical and electrical stresses.

It is further advantageous to provide an additional insulation for the selected separation zones, and to also color-code the impregnating, or separation resinous medium applied to the insulation at the selected separation sections of the coil, for the purpose of more readily identifying such sections in a visual manner.

Figure 3:
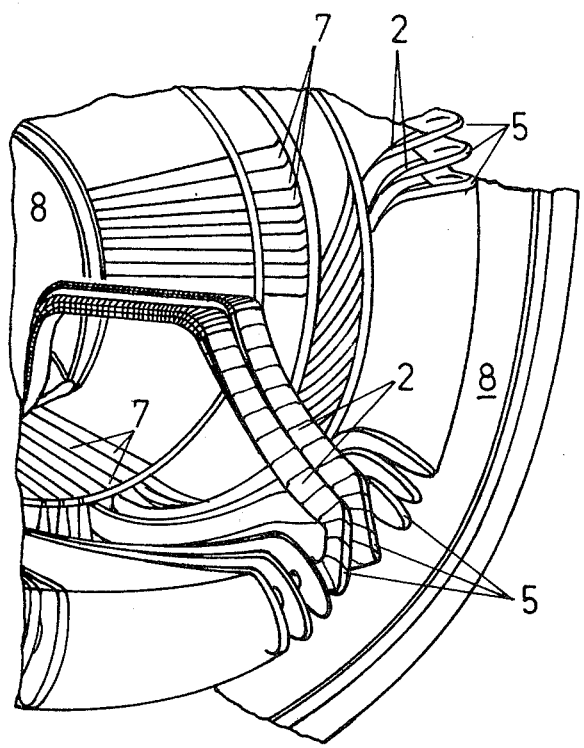

The accompanying drawings which illustrate the essential novel steps involved in making up a coil incorporating the desired separation zone are comprised of three figures in which:

FIG. 1 is a view of the head portion at one end of the coil which overhangs the corresponding end of the stator of a dynamo-electric machine and which shows a separation zone together with various layers of applied insulation;

FIG. 2 is a view of the same coil head portion as in FIG. 1 but illustrating the various conductors in the coil at the separation zone when they have been exposed by removal of the insulation layers and disconnected; and FIG. 3 is a partial view of an end portion of the stator component and the coils partially installed therein prior to final impregnation, With reference now to FIG. 1, the coil is seen to be comprised of several individual conductors 1 each of which is covered by a suitable insulation such as a coating of enamel, or braided glass fibers. The conductor bundle is formed to the desired coil configuration as dictated by the structure of the slotted machine component in which it is to be installed and the coil is then covered with insulation tape, preferably consisting of a combination of glass silk and fine mica one of more layers of which is being wound on. Insulation 3 is then covered by winding thereon another insulation tape 4 which is covered by a glow protection layer 4a. The extreme end of the head portion of the coil is indicated at 5 and the separation zone is marked out by the line 6—6.

In accordance with the invention, prior to application of the insulation tape 3, a non-adhesive silicon resin is applied to the insulated conductors 1, throughout the separation zone 6—6 and in such manner that the resin will also penetrate any spaces between these conductors. This non-adhesive resin is also applied to each of the insulation bandages 3 and 4 at the zone 6—6 after it is wound on so as to also impregnate them and prevent any sticking together.

The same coil is illustrated by FIG. 2 but after the separation zone has been opened up for repair and the various conductors disconnected.

FIG. 3 illustrates completed coils 2 installed in slots 7 in a stator 8 of the dynamo-electric machine prior to final impregnation with the hardenable synthetic resin.

The use of the separation medium at the separation zones 6—6 of the coil head 5, preferably a non-adhesive silicon resin serves to prevent gluing together of the individual insulation bandages 3 and 4, as well as any gluing together of individual, insulated conductors 1 to each other and to those layers, and thus the insulation of the conductors 1 will remain flexible at the separation zone 6—6 that has been pre-treated with the separation medium. It thus becomes feasible, in the event of a break-down in one or more coils, to open up and separate individual conductors 1 from each other, or to remove winding units comprising individual coils 2, and to replace them with new coils. It is always necessary to treat the individual conductors in the manner proposed by the invention while it is not absolutely necessary to do so in the case of the main insulation because here a deformation will often not be required when repairs are being made.

By dyeing the separation medium, i.e. the non-adhesive silicon resin, with bright coloring material, the selected separation zones 6—6 will remain visible even after the final impregnation step with the hardenable synthetic resin has been carried out. This facilitates detection of the separation zones 6—6 on the coils 2 and thus aids in the repair of defective units.

Thus the improved method in accordance with the invention makes it possible to perform repairs on coils in a simple manner and at any time, even in the case of fully impregnated windings.

I claim:

1. In the method of the manufacture and installation of current-carrying coil units utilized in the construction of dynamo-electric machines having magnetic cores with slots therein the steps which comprise:
   a. forming the coil units and shaping them to a desired configuration, which includes a slot-receiving portion and a coil head at each end of said slot receiving portion, from a plurality of individual pre-insulated conductors,
   b. applying a non-adhesive separation medium to the insulated conductors of the coil units at a predetermined zone in each of the coil heads, said predetermined zones each comprising a relatively small portion of the coil heads in order to form desired separation zones,
   c. wrapping the entire coil with one or more layers of an impregnatable mica-containing insulation tape,
   d. impregnating the mica-containing insulating tape with the non-adhesive separation medium at said predetermined zones in the coil heads,
   e. installing the coils in their respective slots in the machine component such that the coil heads extend beyond and thus overhang the ends of the slots, and
   f. finally impregnating the machine component together with the entire coils installed therein with a curable synthetic resin and which is thereafter cured to its final hardened state, said curable synthetic resin however being blocked out of the separation zones by the non-adhesive separation medium applied thereto thereby facilitating future opening up of the coil at the separation zones and separation of the insulated conductors for purposes of coil repair.

2. The method as defined in claim 1 for the manufacture and installation of current-carrying coil units in a dynamo-electric machine wherein the separation zones are located at the extreme end of each coil head.

3. The method as defined in claim 1 for the manufacture and installation of current-carrying coil units of a dynamo-electric machine wherein an elastic insulation is applied to the separation zones.

4. The method as defined in claim 1 for the manufacture and installation of current-carrying coil units in a dynamo-electric machine wherein the non-adhesive separation medium is color-coded so as to facilitate location of the separation zone.

5. The method as defined in claim 1 for the manufacture of current-carrying coil units in a dynamo-electric machine wherein the separation zones are color-coded to facilitate location thereof in the coil head.

* * * * *